United States Patent

Power et al.

[11] Patent Number: 5,848,388
[45] Date of Patent: Dec. 8, 1998

[54] SPEECH RECOGNITION WITH SEQUENCE PARSING, REJECTION AND PAUSE DETECTION OPTIONS

[75] Inventors: Kevin Joseph Power; Stephen Howard Johnson; Francis James Scahill; Simon Patrick Ringland, all of Suffolk; John Edward Talintyre, Essex, all of United Kingdom

[73] Assignee: British Telecommunications plc, London, United Kingdom

[21] Appl. No.: 525,730
[22] PCT Filed: Mar. 25, 1994
[86] PCT No.: PCT/GB94/00630
   § 371 Date: Dec. 19, 1995
   § 102(e) Date: Dec. 19, 1995
[87] PCT Pub. No.: WO94/22131
   PCT Pub. Date: Sep. 29, 1994

[30] Foreign Application Priority Data

Mar. 25, 1993 [EP] European Pat. Off. .............. 93302302
Mar. 31, 1993 [EP] European Pat. Off. .............. 93302541

[51] Int. Cl.⁶ ................................ G10L 5/06; G10L 9/00
[52] U.S. Cl. ............................................ 704/239; 704/254
[58] Field of Search ................................ 395/2.48, 2.63; 704/239, 254

[56] References Cited

U.S. PATENT DOCUMENTS

| Re. 31,188 | 3/1983 | Pirz et al. | 395/2.61 |
|---|---|---|---|
| 4,348,553 | 9/1982 | Baker et al. | 395/2.5 |
| 4,481,593 | 11/1984 | Bahler | 364/513.5 |
| 4,761,815 | 8/1988 | Hitchcock | 395/2.48 |
| 4,783,804 | 11/1988 | Juang et al. | 395/2.54 |
| 4,803,729 | 2/1989 | Baker | 395/2.5 |
| 4,809,331 | 2/1989 | Holmes | 381/41 |
| 4,829,578 | 5/1989 | Roberts . | |

(List continued on next page.)

FOREIGN PATENT DOCUMENTS

| 024837 | of 1987 | European Pat. Off. . |
|---|---|---|
| 0474496 A3 | 3/1992 | European Pat. Off. . |
| 0518742A1 | 12/1992 | European Pat. Off. . |
| 0535929 A2 | of 1993 | European Pat. Off. . |

OTHER PUBLICATIONS

Lamel et al, "An Improved Endpoint Detector for Isolated Word Recognition", IEEE Transactions on Acoustics, Speech and Signal Processing, vol. 29, No. 4, Aug. 1981, New York, US, pp. 777–785.

IBM Technical Disclosure Bulletin, vol. 34, No. 9, Feb. 1992, New York, US, pp. 267–269, "Method of Endpoint Detection".

Austin et al, "A Unified Syntax Direction Mechanism for Automatic Speech Recognition Systems Using Hidden Markov Models", ICASSP, vol. 1, May 1989, Glasgow, pp. 667–670.

(List continued on next page.)

*Primary Examiner*—David R. Hudspeth
*Assistant Examiner*—Robert Louis Sax
*Attorney, Agent, or Firm*—Nixon & Vanderhye, P.C.

[57] ABSTRACT

A recognition system includes a speech recognition processing unit for processing input speech signals to indicate similarity to predetermined patterns to be recognized. The recognition processing unit is arranged to repeatedly partition the input speech signal into a pattern-containing portion and, preceding and following the pattern-containing portions, noise or silence portions, and to identify a pattern corresponding to the pattern containing portion. An output supplies a recognition signal indicating recognition of one of the patterns. A pause detector detects the noise or silence portion which follows the pattern-containing portion. In response to its detection, a signal identifying the pattern currently corresponding to the pattern portion is supplied to the output. Also provided are similarly operating rejection portions.

32 Claims, 12 Drawing Sheets

U.S. PATENT DOCUMENTS

| | | | |
|---|---|---|---|
| 4,837,831 | 6/1989 | Gillick et al. | 395/2.54 |
| 4,888,823 | 12/1989 | Nitta et al. . | |
| 4,908,918 | 3/1990 | Bahl et al. . | |
| 4,989,248 | 1/1991 | Schalk et al. | 395/2.48 |
| 5,040,127 | 8/1991 | Gerson . | |
| 5,228,110 | 7/1993 | Steinbiss . | |
| 5,309,547 | 5/1994 | Niyada et al. . | |
| 5,388,183 | 2/1995 | Lynch . | |
| 5,390,278 | 2/1995 | Gupta et al. | 395/2.52 |
| 5,524,169 | 6/1996 | Cohen et al. | 395/2.4 |
| 5,583,961 | 12/1996 | Pawlewski et al. | 395/2.5 |
| 5,621,859 | 4/1997 | Schwartz et al. | 395/2.65 |

OTHER PUBLICATIONS

Young et al, "Token Pasing: A Simple Conceptual Model for Connected Speech Recognition Systems", Cambridge University Engineering Department, Jul. 31, 1989, pp. 1–23.

Kitano, An Experimental Speech–to–Speech Dialog Translation System, IEEE, Jun. 1991, DM–Dialog, Carnegie Mellon University and NEC Corporation.

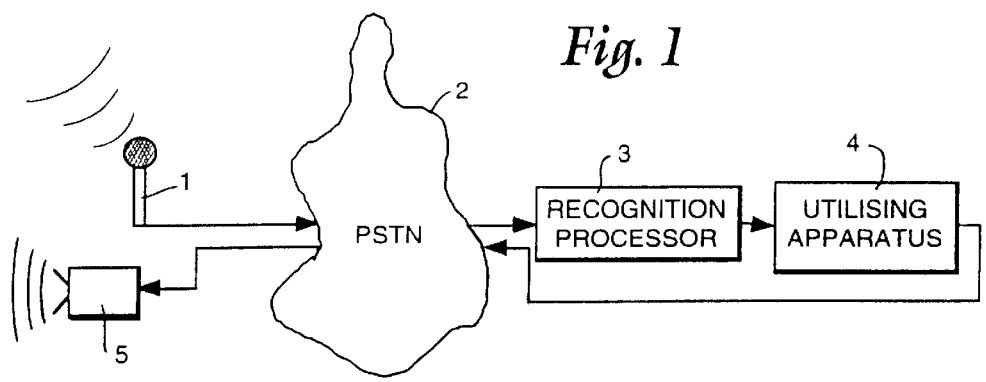
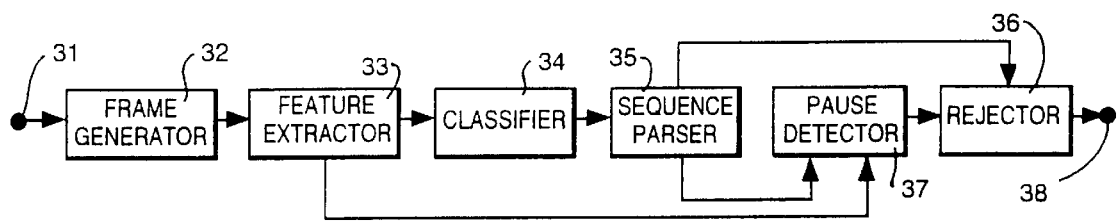

SPEECH RECOGNITION WITH SEQUENCE PARSING, REJECTION AND PAUSE DETECTION OPTIONS

BACKGROUND OF THE INVENTION

1. Field of the Invention

This invention relates to methods and apparatus for speech recognition. Speech recognition is used as an input means for control of machines. At present, speech recognition apparatus generally recognises isolated single words. Speech recognition apparatus is also being developed which is intended to recognise multiple words spoken consecutively in a sentence or phrase; this is referred to as connected speech recognition.

2. Related Art

In speech recognition, a microphone picks up a speech signal from a speaker which is then digitised and processed for recognition. However, the microphone generally also picks up any background or ambient noise and the electrical system between the microphone and the speech recognition apparatus will likewise add noise (e.g. thermal noise, quantising noise and—where the speech is transmitted through a telecommunications channel—line noise). The noise may resemble parts of speech, for example unvoiced sibilant sounds. Accordingly, the correct recognition of a word depends strongly on the ability to distinguish the beginning and the end of the word, which correspond to the end and beginning of noise or silence. The reliability of speech recognition has been shown to depend strongly on the identification of the correct start and end points for speech.

One speech processing method which is intended to allow the recognition of a sequence of words using isolated word recognition technology as the "connected-for-isolated" (CFI) technique, described in our co-pending EP patent application 93302538.9 and incorporated herein by reference (corresponding to U.S. patent application Ser. No. 08/530,157 filed Sep. 29, 1995 as the US National Phase of PCT/BG94/00704 filed Mar. 31, 1994. This technique assumes that the signal from the microphone will include alternating periods of speech and noise, and attempts to recognise alternately speech and noise.

A common approach in speech recognition is to use statistical processing, making no initial assumptions about the mechanisms by which speech is produced. For example, hidden Markov modeling (HMM) techniques are used (as described in British Telecom Technology Journal, April 1988, vol 6 Number 2 page 105, Cox). In HMM recognition, each incoming frame of speech is compared with a number of states, to determine the likelihood of the speech frame corresponding to each of those states, and the state probabilities thus generated are compared with a number of predetermined models comprising state sequences corresponding to different words to be recognised. Whilst a word is being recognised, a number of different state sequences, and hence a number of different words, are simultaneously possible; the final determination of which state sequence was observed is made by selecting the most likely state sequence when the whole utterance is received.

Some types of HMM speech recognition maintain, during recognition, a number of possible state sequences, including a current most probable sequence for defining the word which has been recognised.

In such sequential recognisers, since the decision as to the identity of the selected word is based on the sequences of states generated, the decision cannot be made until the sequence is complete. The most likely state sequence can be recalculated for each received frame, so that as soon as the end of a word can unambiguously be identified, recognition is performed by simply outputting a recognition signal corresponding to the current most likely state sequence. The recognition process will itself produce start and end points, but this is done in conjunction with the selection of the word which is recognised and not as a separate, preliminary, end pointing step.

A CFI recogniser is therefore able to automatically locate the start and end of a word, by maintaining state sequences corresponding to noise, and recognising the sequence of noise-word-noise in the speech signal. However, many words may include gaps or stops between parts of the word, which might be misrecognised as the end of a word. Accordingly, it is important that the final identification of a word should not take place until the speaker has definitely finished speaking.

One method of achieving this is to provide a "time out" after a predetermined time period which can unambiguously be identified as noise. However, we have found that if the period concerned is made long enough to guarantee success, the result is a delay which can be frustratingly long to the user.

SUMMARY OF THE INVENTION

One aspect of the invention therefore provides a means of detecting the end of speech for a recogniser of the type in which a most likely state sequence is selected.

In one aspect, the invention provides a speech recognition system comprising means for successfully generating recognition outputs based on partitioning an input utterance into a speech portion and a following noise portion, characterised by means for detecting the presence of the following noise portion by testing the partitioning using a parameter derived from the input speech signal. Preferably, the or each parameter is based on the energy of the input speech signal. Preferably, the parameter comprises a parameter indicating the relative magnitudes of the speech portion and the noise portion indicated by the said partition. Additionally or alternatively, the parameter provides a measure of the variation of the energy of the noise portion according to the partition. Preferably, in either case, the energy is smooth or averaged over several successive time periods, and preferably the averaging is non-linear so as to limit the influence of short spikes of energy differing from the running average.

Where speech recognition apparatus has recognised a word by electing the most likely possible word, the possibility exists that the recognition was made in error, based either on a similar word (for example one not in the vocabulary of the recogniser) or noise.

Means for rejecting the recognition of certain misrecognised words are described in "rejection of extraneous input in speech recognition applications, using multilayer perceptions and the trace of HMM's", Mathan and Miclet, 1991 IEEE ICASSP 91 vol 1 pages 93–96, and in "rejection techniques in continuous speech recognition using hidden Markov models", Moreno et al, signal processing V: Theories and Applications, 1990, Proc. of EUSIPCO—90 vol 2 pages 1383–1386 (Elsevier).

Accordingly, the object of another aspect of the invention is to provide an improved means for rejecting certain words after they have been identified by a speech recogniser.

Accordingly, one aspect of the invention provides a recognition system comprising: input means for receiving a speech signal; recognition processing means for processing the speech signal to indicate its similarities to predetermined patterns to be recognised; output means for supplying a recognition signal indicating recognition of one of said patterns; and rejection means for rejecting the recognition signal under predetermined conditions, characterised in that the rejection means are arranged to receive at lease one signal parameter derived from said speech signal which does not depend upon the output of said recognition means.

As a speech signal varies spectrally rather slowly, it is known in speech recognition to partition the speech signal into a time series of frames of duration typically between 10 to 100 milliseconds, comprising a plurality of speech samples. It has been proposed ("The use of variable frame rate analysis in speech recognition", Ponting and Peeling, Computer Speech and Language (1991) 5, 169–179) to limit the number of frames thus generated, by only generating a new frame when the speech signal has changed significantly from the previous frame.

Accordingly, a further aspect of the invention provides a pause detection means, and/or a rejection means, for use in a recogniser employing a variable frame rate.

BRIEF DESCRIPTION OF THE DRAWINGS

Other aspects and embodiments of the invention are as described and/or claimed herein, with advantages which will be apparent from the following description and drawings.

The invention will now be described by way of example only, with reference to the accompanying drawings, in which:

FIG. 1 shows systematically an application of a recognition system according to the present invention;

FIG. 2 is a block diagram showing systematically the elements of the recognition processor forming part of FIG. 1 according to the embodiment of the invention;

DETAILED DESCRIPTION OF EXEMPLARY EMBODIMENTS

First Embodiment

Figure 3:
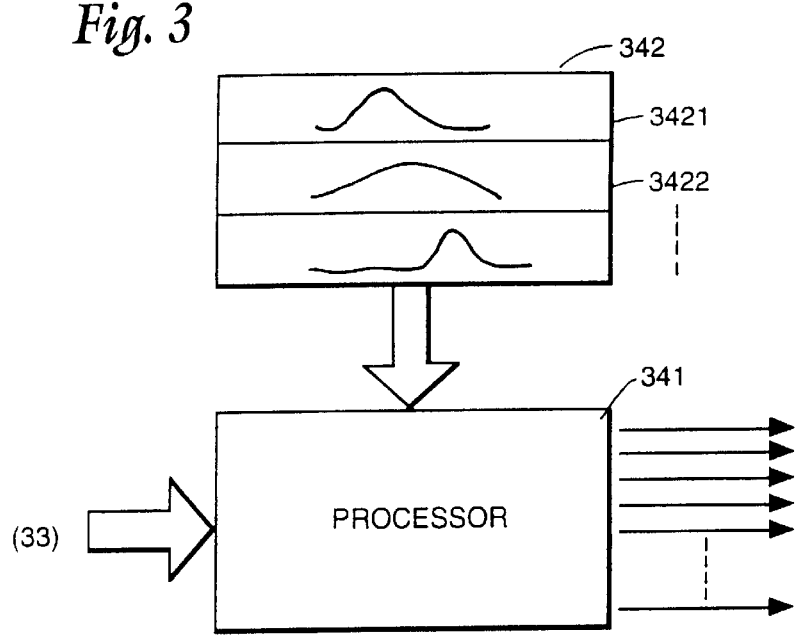
FIG. 3 is the block diagram indicating systematically the components of the classifier forming part of the embodiment of FIG. 2.

Referring to FIG. 1, a telecommunications system including speech recognition generally comprises a microphone 1 typically forming part of a telephone handset, a telecommunications network (typically a public switched telecommunications network (PSTN)) 2, a recognition processor 3, connected to receive a voice signal from the network 2, and a utilising apparatus 4 connected to the recognition processor 3 and arranged to receive therefrom a speech recognition signal, indicating recognition or otherwise of particular words or phrases, and to take action in response thereto. For example, the utilising apparatus 4 may be a remotely operated banking terminal for effecting banking transactions.

In many cases, the apparatus 4 will generate an auditory response to the speaker, transmitted via the networks 2 to a loudspeaker 5 typically forming a part of the subscriber handset.

In operation, a speaker sneaks into the microphone 1 and an analog speech signal is transmitted from the microphone 1 into the network 2 to the recognition processor 3, where the speech signal is analysed and a signal indicating identification or otherwise of a particular word or phrase is generated and transmitted to the utilising apparatus 4, which then takes appropriate action in the event of recognition of an expected word or phrase.

For example, the recognition processor 3 may be arranged to recognise digits 0 to 9, "yes" and "no" so as to be able to recognise personal identification numbers and a range of command words for initiating particular actions (for example, requesting statements or particular services).

Referring to FIG. 2, the recognition processor 3 comprises an input 31 for receiving speech in digital form (either from a digital network or from an analog to digital converter), a frame processor 32 for partitioning the succession of digital samples into frames of contiguous samples; a feature extractor 33 for generating from the frames of samples a corresponding feature vector; a classifier 34 receiving the succession of feature vectors and operating on each with the plurality of models corresponding to different words, phonemes or phrases to generate recognition results; and a parser 35 which is arranged to receive the classification results from the classifier 34 and to determine the word to which the sequence of classifier outputs indicates the greatest similarity.

Also provided is a recognition rejecter 36 arranged to reject recognition of a word recognised by the parser 35 if recognition is unreliable, and a pause detector 37, arranged to detect the pause following the end of a word to enable the parser 35 to output a word recognition signal. The word recognition signal from the parser 35, or a rejection signal from the rejecter 36, is output to a control signal output 38, for use in controlling the utilising apparatus 4. coefficient and the corresponding coefficent value in the preceding frame, as described in "On the use of Instantaneous and Transitional Spectral Information in Speaker Recognition", Soong & Rosenberg, 1988 IEEE Trans. on Accoustics, Speech and Signal Processing Vol 36 No. 6 p871. Equally, a mixture of several types of feature coefficients may be used.

For reasons that will be discussed below, in this embodiment the feature extractor 33 also extracts a value for the energy in each frame (which energy value may, but need not, be one of the feature coefficients used in recognition). The energy value may be generated as the sum of the squares of the samples of the frame.

Finally, the feature extractor 33 outputs a frame number, incremented for each successive frame.

The frame generator 32 and feature extractor 33 are, in this embodiment, provided by a single suitable programmed digital signal processor (DSP) device (such as the Motorola DSP 56000, the Texas Instruments TMS C 320 or similar device.

Classifier 34 referring to FIG. 3, in this embodiment, the classifier 34 comprises a classifying process of 341 and a state memory 342.

The state memory 342 comprises a state field 3421, 3422, . . . , for each of the plurality of speech states. For example, each word to be recognised by the recognition processor comprises 6 or 8 states, and accordingly 6 or 8 state fields are provided in the state memory 342 for each word to be recognised. There are also provided a state field for noise/silence at the beginning of a word and a state field for a noise/silence state at the end of a word (although it might in practice be possible to provide only a single noise state).

Each state field in the state memory 342 comprises date defining a multidimensional Gaussian distribution of feature coefficient values which characterise the state in question.

For example, if there are d different feature coefficients, the data characterising a state are a constant S, a set of d feature mean values $\mu_i$ and a set of d feature deviations, $\sigma_i$; in other words, a total of 2d+1 numbers.

Figure 4:
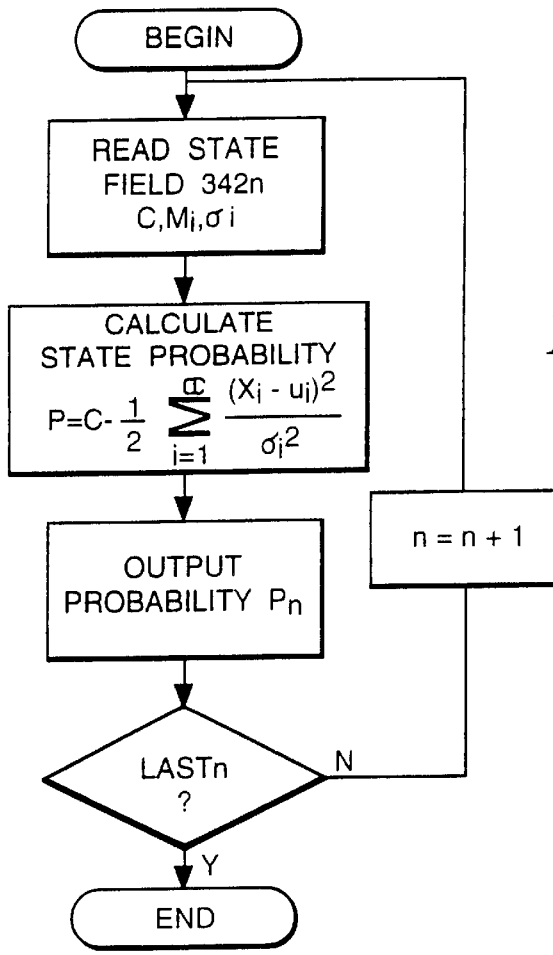
FIG. 4 is a flow diagram showing systematically the operation of the classifier of FIG. 3.

The classification processor 34 is arranged to read each state field within the memory 342 in turn, and calculate for each, using the current input feature coefficient set, the probability that the input feature set or vector corresponds to the corresponding state. To do so, as shown in FIG. 4, the processor 341 is arranged to calculate an equation $$P = C - \frac{1}{2} \sum_{i=1}^{d} \frac{(x_i - \mu_i)^2}{\sigma_i^2}$$

It is possible for a single state to be represented by several different modes or distributions; accordingly, the state memory 342 may comprise, for each state, several mode fields each corresponding to the state field described above, in which case the classification processor 341 is arranged to calculate for each mode the probability that the input vector corresponds to that mode, and then to sum the modal probabilities (weighted as appropriate).

Accordingly, the output of the classification processor 341 is a plurality of state probabilities, one for each state in the state memory 342, indicating the likelihood that the input feature vector corresponds to each state.

The classifying processor 341 may be a suitably programmed digital signal processing (DSP) device, may in particular be the same digital signal processing device as the feature extractor 33.

Parser 35

Figure 5:
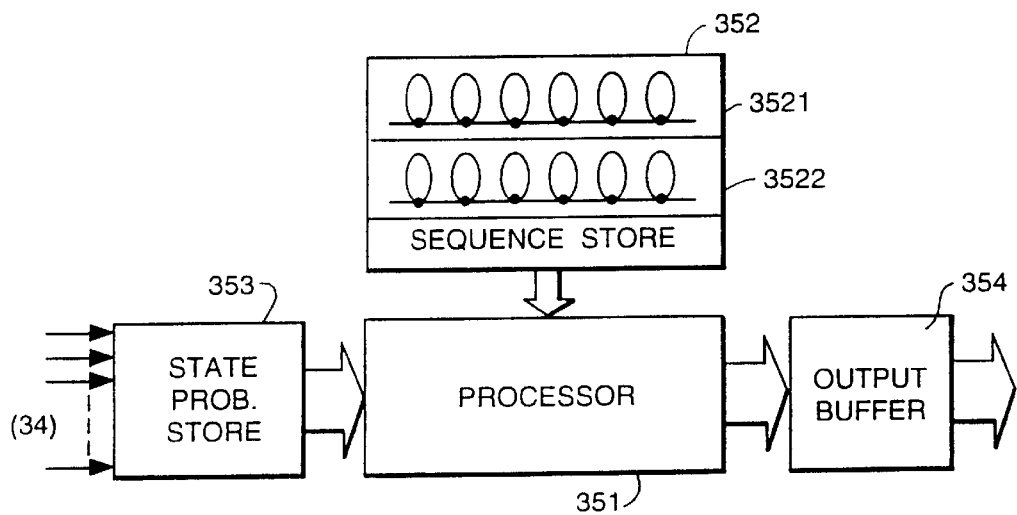
FIG. 5 is a block diagram showing schematically the structure of a sequence parser forming part of the embodiment of FIG. 2.

Referring to FIG. 5, the parser 35 in this embodiment comprises a state sequence memory 352, a parsing processor 351, and a parser output buffer 354.

Also provided is a state probability memory 353 which stores, for each frame processed, the state probabilities output by the probability processor 341. The state sequence memory 352 comprises a plurality of state sequence fields 3521, 3522, . . . , each corresponding to a noise-word-noise sequence to be recognised (and one corresponding to a noise-only sequence.

Figure 6:
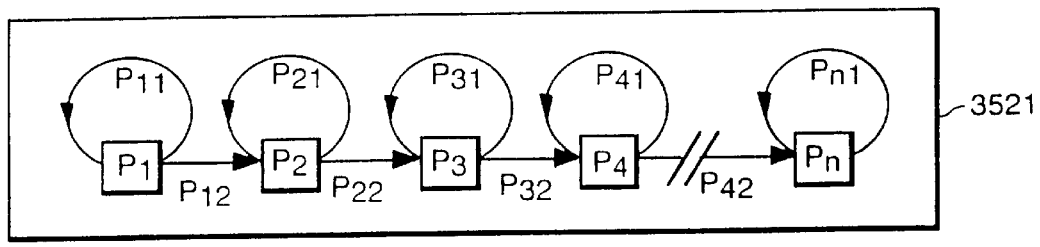
FIG. 6 shows schematically the content of a field within a store forming part of FIG. 5.

Each state sequence in the state sequence memory 352 comprises, as illustrated in FIG. 6, a number of states $P_1$, $P_2$, $P_N$ (where N is 6 or 8) and, for each state, two probabilities; a repeat probability ($P_{11}$) and a transition probability to the following state ($P_{12}$). For a CFI recogniser, the first and final states are noise states. The observed sequence of states associated with a series of frames may therefore comprise several repetitions of each state $P_1$ in each state sequence model 3521 etc; for example:

| Frame Number | 1 | 2 | 3 | 4 | 5 | 6 | 7 | 8 | 9 | Z | Z+1 |
|---|---|---|---|---|---|---|---|---|---|---|---|
| State | P1 | P1 | P1 | P2 | P2 | P2 | P2 | P2 | P2 | Pn | Pn |

Thus, at some frame number (here, frame number 3) the observed sequence will move from the initial, noise, state to the next, speech, state; this transition marks the start of the word to be recognised. Likewise, at some frame (here frame Z) the sequence reaches the last state $P_n$ corresponding to noise or silence following the end of the word to be recognised. Frame Z therefore corresponds to the end of the word to be recognised.

Figure 8:
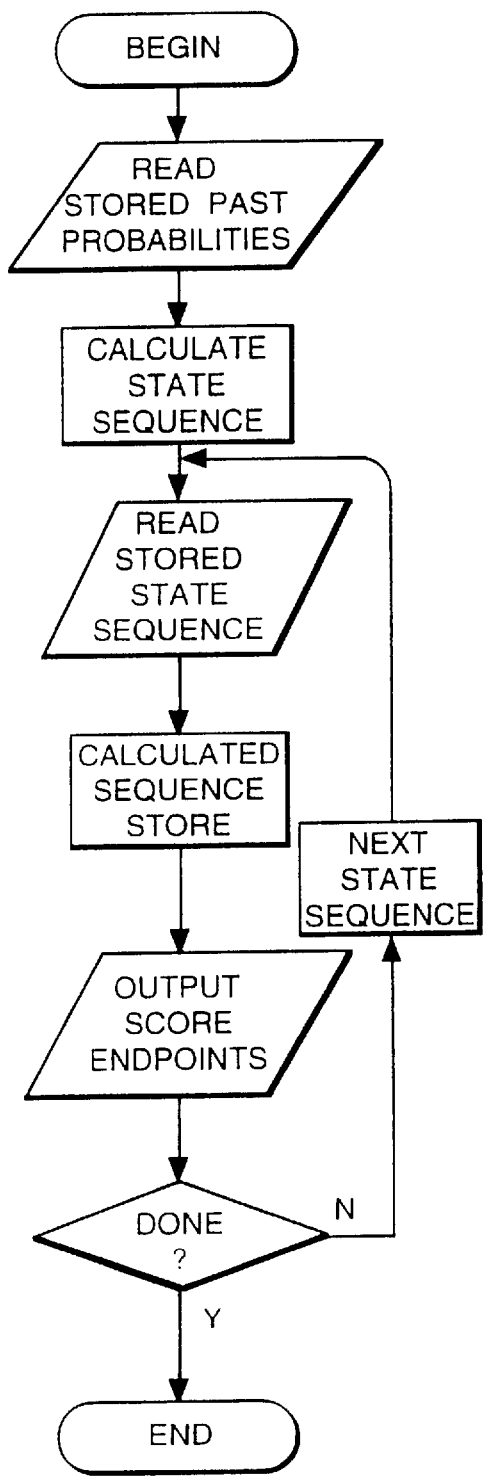
FIG. 8 is a flow diagram showing schematically the operation of the sequence of parser of FIG. 5.

As shown in FIG. 8 the parsing processor 351 is arranged to read, at each frame, the state probabilities output by the probability processor 341 and the previous stored state probabilities in the state probability memory 353 and to calculate the most likely path of states to date over time, and to compare this with each of the state sequences stored in the state sequence memory 352.

The calculation employs the well known hidden Markov model method described in the above referenced Cox paper. Conveniently, the HMM processing performed by the parsing processor 351 uses the well known Viterbi algorithm. The parsing processor 351 may, for example, be a microprocessor such as the Intel (™) i-486(™) microprocessor or the Motorola (™) 68000 microprocessor, or may alternatively be a DSP device for example, the same DSP device as is employed for any of the preceding processors.

Accordingly for each state sequence (corresponding to a word) a probability score is output by the parser processor 351 at each frame of input speech. The identity of the most likely state sequence and hence word recognised) may well change during the duration of the utterance by the speaker.

Figure 7:
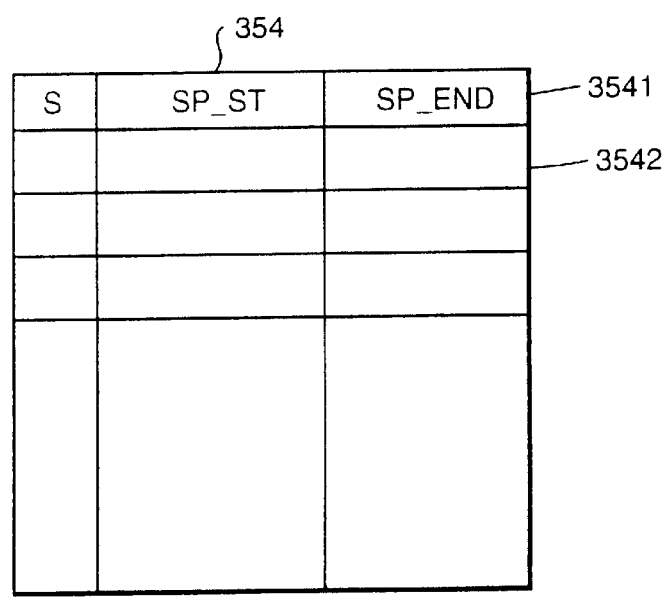
FIG. 7 shows schematically the content of a buffer forming part of FIG. 5.

The parser output buffer 354 comprises a plurality of field 3541, 3542, . . . each corresponding to a word to be recognised (and one which corresponds to a noise-only sequence). Each field, as shown illustratively in FIG. 7, comprises a probability score S indicating, for the current frame, the likelihood of the corresponding word being present, and two frame members; a first (sp_st) which indicates the first frame of the word in the noise-word-noise observed sequence of frames; and a second (sp_end) which indicates the last frame of the word. Before sp_st the states in the observed sequence comprise initial noise and after sp_end, the states in the observed sequence correspond to terminal noise. Naturally, the frame numbers in each of the field 3541, 3542, . . . differ from one another.

Pause Detector 37

Figure 9:
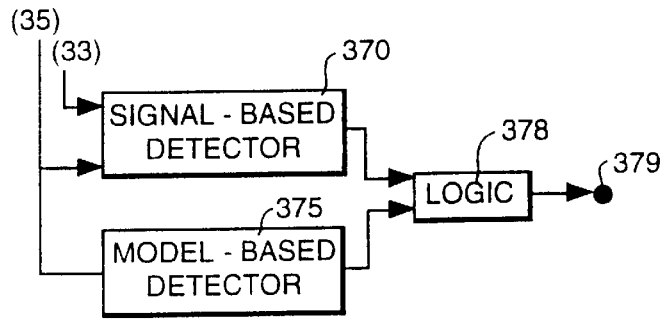
FIG. 9 is a block diagram indicating the structure of a pause detector forming part of the embodiment of FIG. 2.

Referring to FIG. 9, the pause detector 37 comprises a signal based detector 370 and a model based detector 375. The signal based detector 370 is connected to the feature extractor 33, to receive a parameter extracted from the speech signal. In this present embodiment, the parameter is the frame energy, or some parameter based on the frame energy.

The model based detector 375 is connected to the parser 35, to receive an indication of the current best state sequence. Specifically, the model based detector 375 is arranged to read from the parser output buffer 354 the frame number (sp_end) of the start of final noise states, if any, in the current most probable state sequence and to subtract this from the current frame number to find the length of the period following the end of the word which is currently assumed to be recognised.

The output of the signal based pause detector 370 and the model based pause detector 375 are combined by logic 378 to generate a pause detection signal at an output 379.

Figure 10:
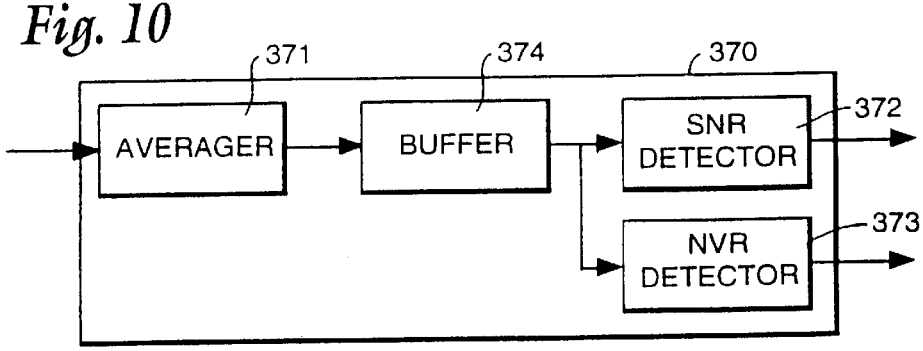
FIG. 10 is a block diagram showing schematically a part of the structure of FIG. 9 in greater detail.

Referring to FIG. 10 the signal based pause detector 370 comprises a running averager 371 which maintains a running average energy level over a number of preceding energy values; a signal to noise ration (SNR) detector 372 and a noise variance (NVR) detector 373, the outputs of which are supplied to be combined by logic 378.

Also provided is a mean energy level buffer 376, connected to the output of the averager 371 to store successive mean energy values corresponding to successive frames.

Running Averager 371

Figure 11:
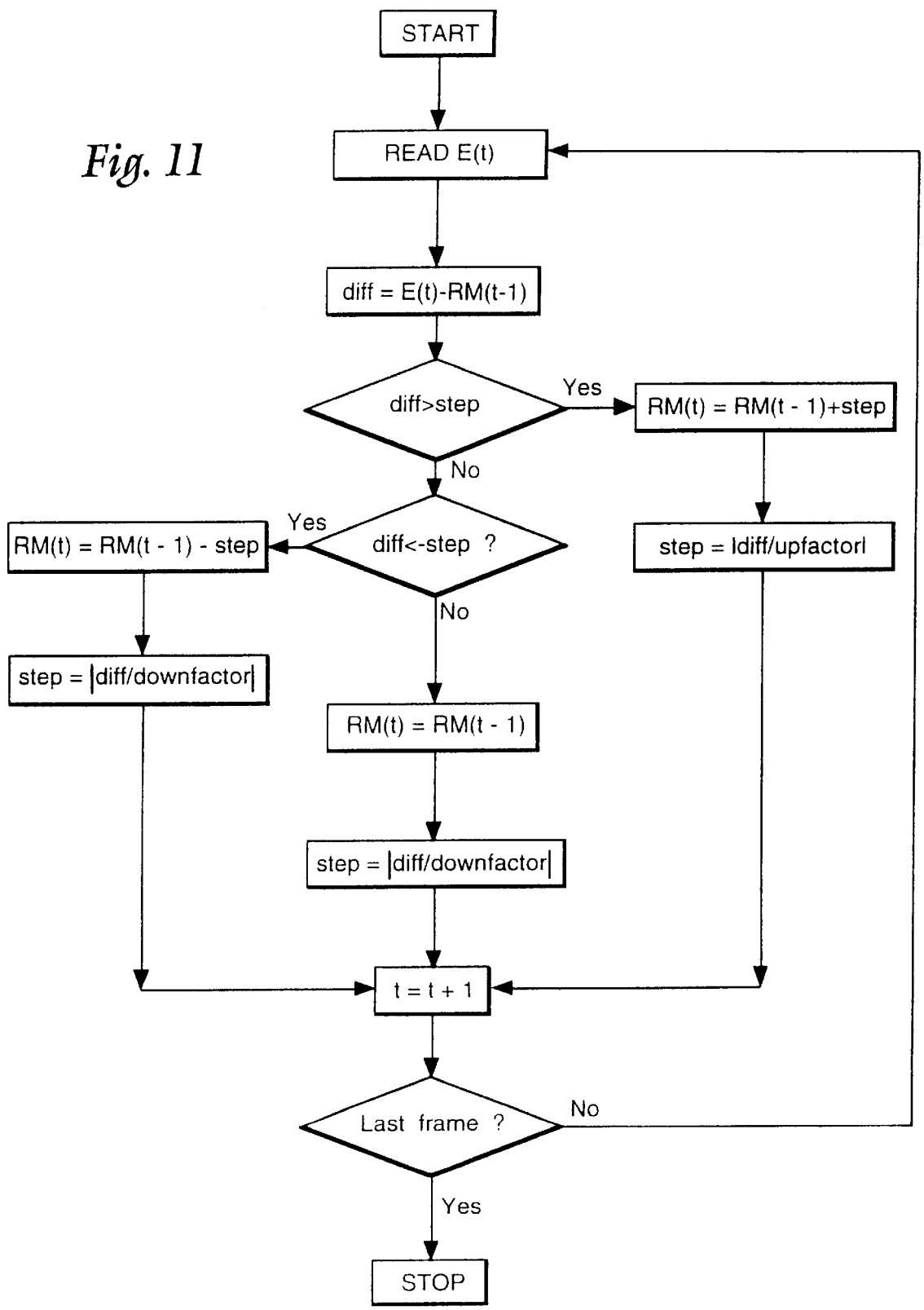
FIG. 11 is a flow diagram illustrating the operation of an average forming part of FIG. 10.

The running averager 371 is arranged schematically to perform the process shown in FIG. 11. In this process, in this embodiment, for each frame the energy of the frame is read from the feature extractor 33, and subtracted from a stored running average value to yield the difference value. The difference value is compared with a threshold or step value. If the difference lies within +/− the step value, the running average is unaffected, but the value of the step is reduced by setting it equal to the difference divided by a constant factor or, as indicated in FIG. 11, a first constant factor (upfactor) for a positive difference from the running mean and a second factor (downfactor) for a negative difference from the running mean.

If, on the other hand, the difference between the present frame input value and the stored running average exceeds the step value, then the running average is incremented or decremented by the step value depending upon the sign of the difference. The step value is then updated as before.

The effect of this process is as follows. Firstly, there is a smoothing of the energy value by the process of maintaining a running average. Thus, the instantaneous running average represents a smoothed value of the energy level of the current frame taking some account of past energy levels.

Secondly, the presence of the threshold test introduces a non-linearity into the process such that high positive or negative energy levels, differing substantially from the previous average energy level, are at first ignored. However, the threshold is subsequently enlarged so that if the high energy level is maintained, it will eventually fall within the threshold and have an effect on the running mean.

Thus, a short lived high every level due to a noise spike will have little or no effect on the running mean energy level, because of the threshold state. However, a genuinely high every level due, for example, to a transition to speech will eventually affect the running mean energy level. The threshold is thus adaptive over time so that where incoming energy levels correspond closely to the current mean, the threshold or step level progressively shrinks to a low value, but where incoming energy levels diverge from the mean, the threshold remains initially low but then expands.

The averager 371 is thus acting to maintain an average level which behaves somewhat like a running median.

SNR Detector 372

The SNR Detector 372 is arranged, at each frame, to input the frame numbers which the parser 35 has identified as the beginning and end frames of the currently most probable recognised word, and to read the average energy level buffer 376, to determine a representative energy level over the frames currently identified as speech and a representative energy level over the frames current represented as noise.

Figure 12:
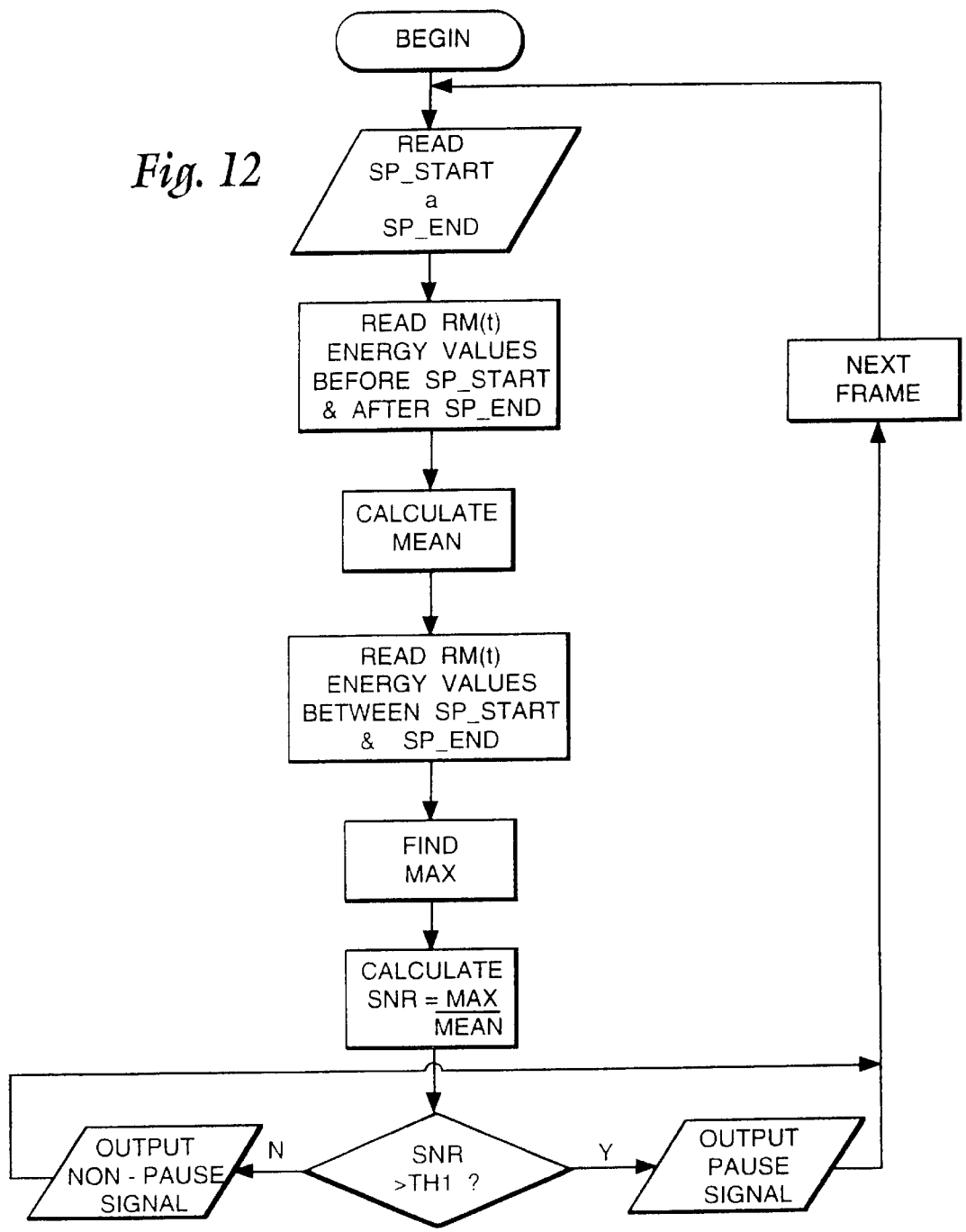
FIG. 12 is a flow diagram illustrating the process of deriving a signal to noise ration by the apparatus of FIG. 10.

In this embodiment, the representative measure comprise the mean running energy level running over the noise segments and the peak average energy level over the speech segment. The operation of the SNR detector 372 is shown in FIG. 12.

If the calculated signal to noise ratio value, SNR, is greater than a predetermined threshold, the SNR pause detector 372 outputs a signal indicating that a pause has occurred (i.e. that speech is over). If the SNR value lies below the threshold, a signal indicating that no pause has been recognised is output.

It is found that the SNR measure is a useful identifier of whether a correct word ending has been identified. This is partly because an erroneous recognition by the parser 35 of the start and end (and, indeed, the identity) of a word may result in speech frames being included in those frames used to calculate the mean noise level, and hence reducing the value of the SNR calculated to below the threshold so that a pause is not wrongly identified for this reason. By using the peak energy level as the characteristic energy level for speech in the SNR calculating, the reverse effect is generally avoided since the peak will generally be unaffected by wrongful identification of the start and end of the word (unless a completely erroneous recognition has taken place).

NVR Detector 373

Figure 13:
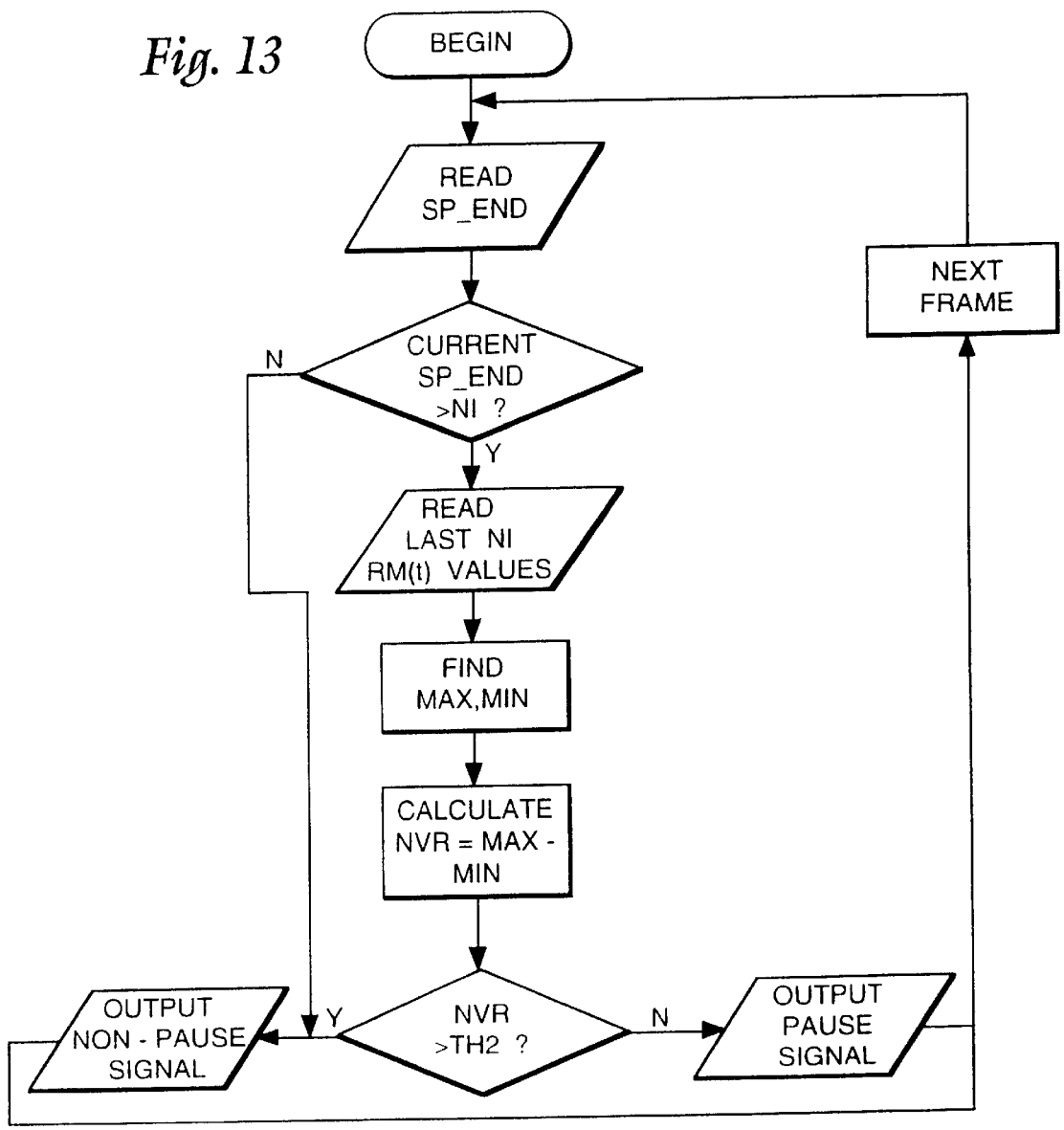
FIG. 13 is a flow diagram illustrating the process of forming a measure of signal variance by the apparatus of FIG. 10.

Referring to FIG. 13 the NVR Detector 373 is arranged to read the last N1 (where N1 is a predetermined constant) running average energy levels from the buffer 376, and to find the minimum and maximum values, and to calculate the ratio between the minimum and the maximum values. This ratio indicates the amount of variation of the energy level over the most recent N1 frames. If the level of variation is compared with the threshold; a high level of variation indicates the possibility that the preceding N1 frames include some speech, whereas a low level of variation compared to a predetermined threshold indicates that the last N1 frames are likely to contain only noise, and consequently the NVR detector 373 outputs a pause detection signal.

Since the energy level of the silence period following the end of speech may be low, the ratio may under some circumstances correspond to division by a very small number. Accordingly, to avoid singularities in calculation, where the minimum average energy falls below a predetermined threshold level (for example, unity) then the ratio is calculated between the maximum and the predetermined level, rather than between the maximum and the minimum.

Other measures of the variance (for example, the difference between the maximum and minimum) could be employed, however the ratio is preferred since it takes account of gross variations in overall signal strength.

Model Based Detector 375

Figure 14:
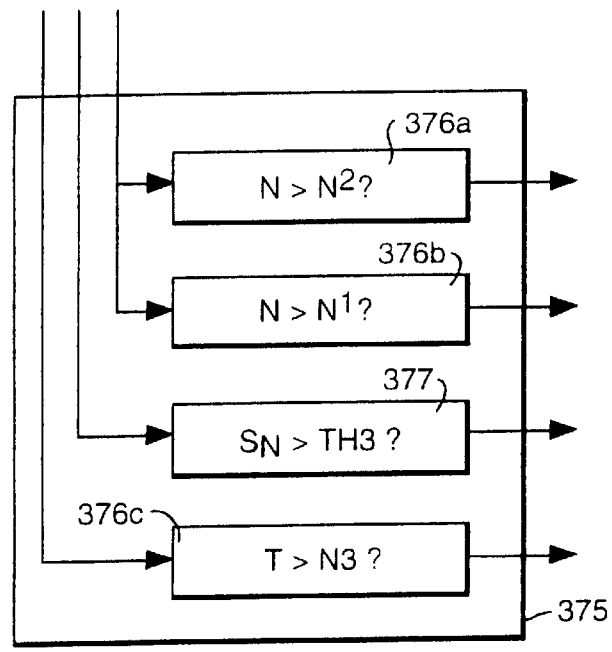
FIG. 14 is a block diagram showing in greater detail a part of the structure of FIG. 10.

The model based pause detector comprises, as shown in FIG. 14, first and second time out detectors 376a, 376b arranged to input from the parser 35 the frame number of the currently identified end of speech/start of end noise, and to test the difference N between this frame and the present frame against a first, relatively short, threshold N1 and a second, relatively long, threshold N2. For example, N1 is selected to be on the order of the length of a short gap within a word (i.e. 20–60 frames, and conveniently the same length as the test used in the NVR detector 373) and N2 is selected to be substantially longer (i.e. on the order of half a second).

Also provided is a noise score tester 377, which is arranged to read from the parser 35 the likelihood score for the end noise corresponding to the current most likely state sequence, and to test the score against a predetermined threshold, and to output a 'pause detector' signal in the event that the noise score exceeds the threshold.

Finally, a third time out detector 376c is provided, which tests the total number of frames to date (current frame number) T against a long time out N3, so as to terminate the recognition process after N3 frames if no end of speech has earlier been detected.

Combination Logic 378

Figure 15:
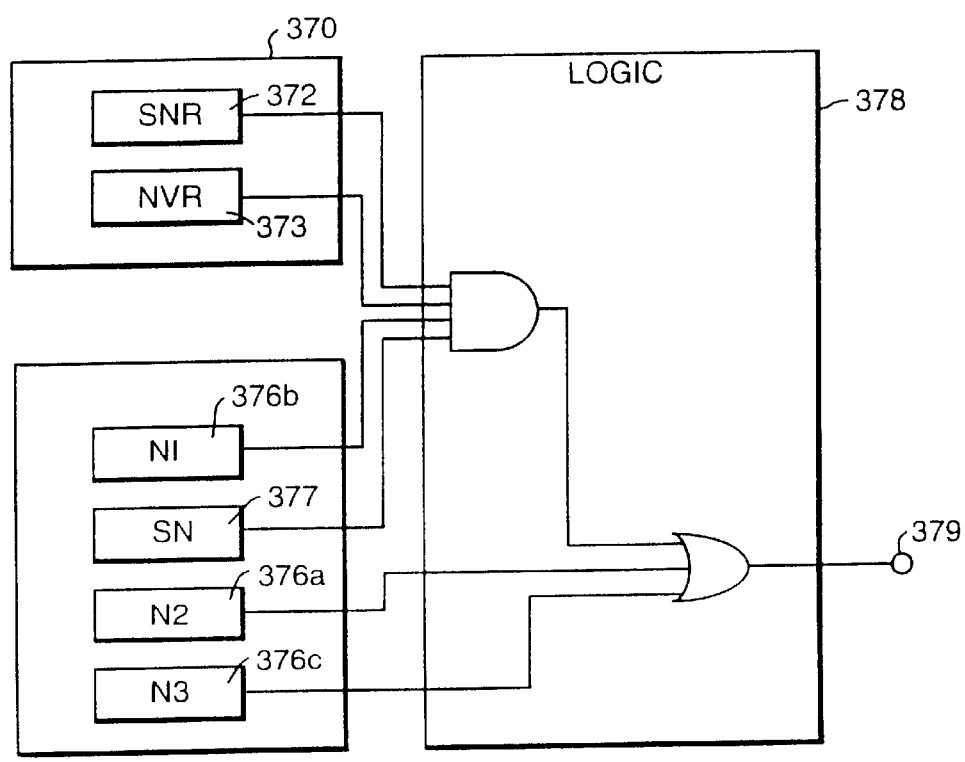
FIG. 15 is a block diagram showing in greater detail the combination logic forming part of FIG. 10.
Figure 16:
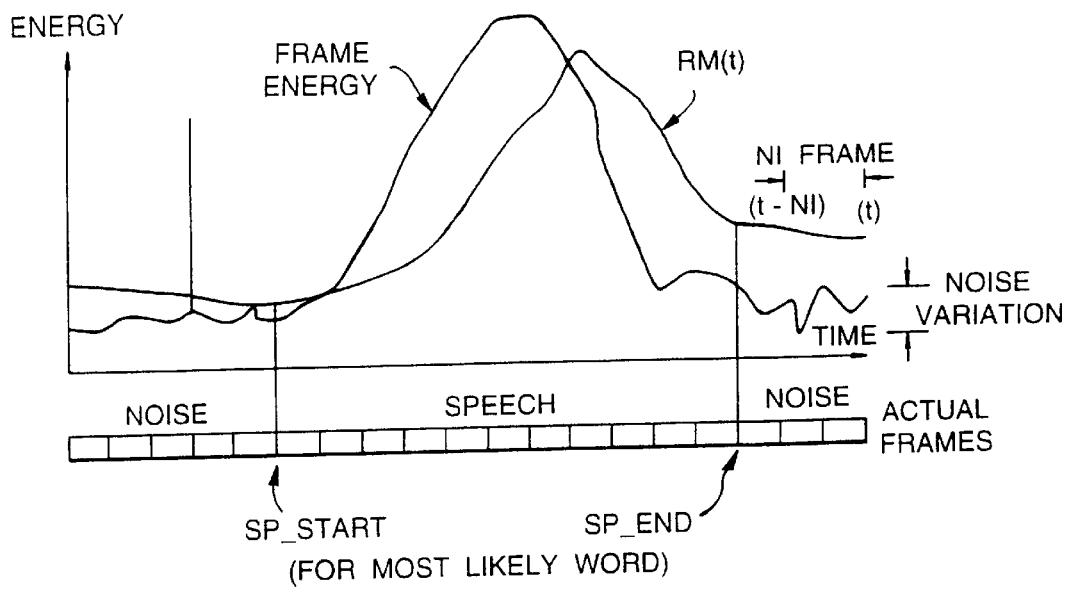
FIG. 16 is a diagram of energy and averaged energy of a speech signal over time and indicating the correspondence with signal frames.

Referring to FIG. 15, it will be seen that the outputs of the detectors 376b, 377, 372, and 373 are connected in an AND relationship, and the combined output of the four is connected in an OR relationship with the output of the detectors 376a and 376c.

Thus, a pause is detected either after the expiry of a long timeout (N3 frames) from the start of recognition, or after a relatively long time out (N2 frames) after the onset of noise, or after a relatively short time out (N1 frames) following which the noise score is high, the signal to noise ratio is high and the noise variance is low.

Rejector 36

The rejector 36 is arranged, after the operation of the pause detector 37, to test the level of confidence of the identification of a word by the parser 35. If the identification is suspect, it is rejected. If the identification is tentative the rejector 36 issues a "query" signal which enables the utilising apparatus 4 to, for example, initiate a confirmatory dialogue by synthesising a phrase such as "did you say . . . (the identified word)" or to ask the user to repeat the word.

Figure 17:
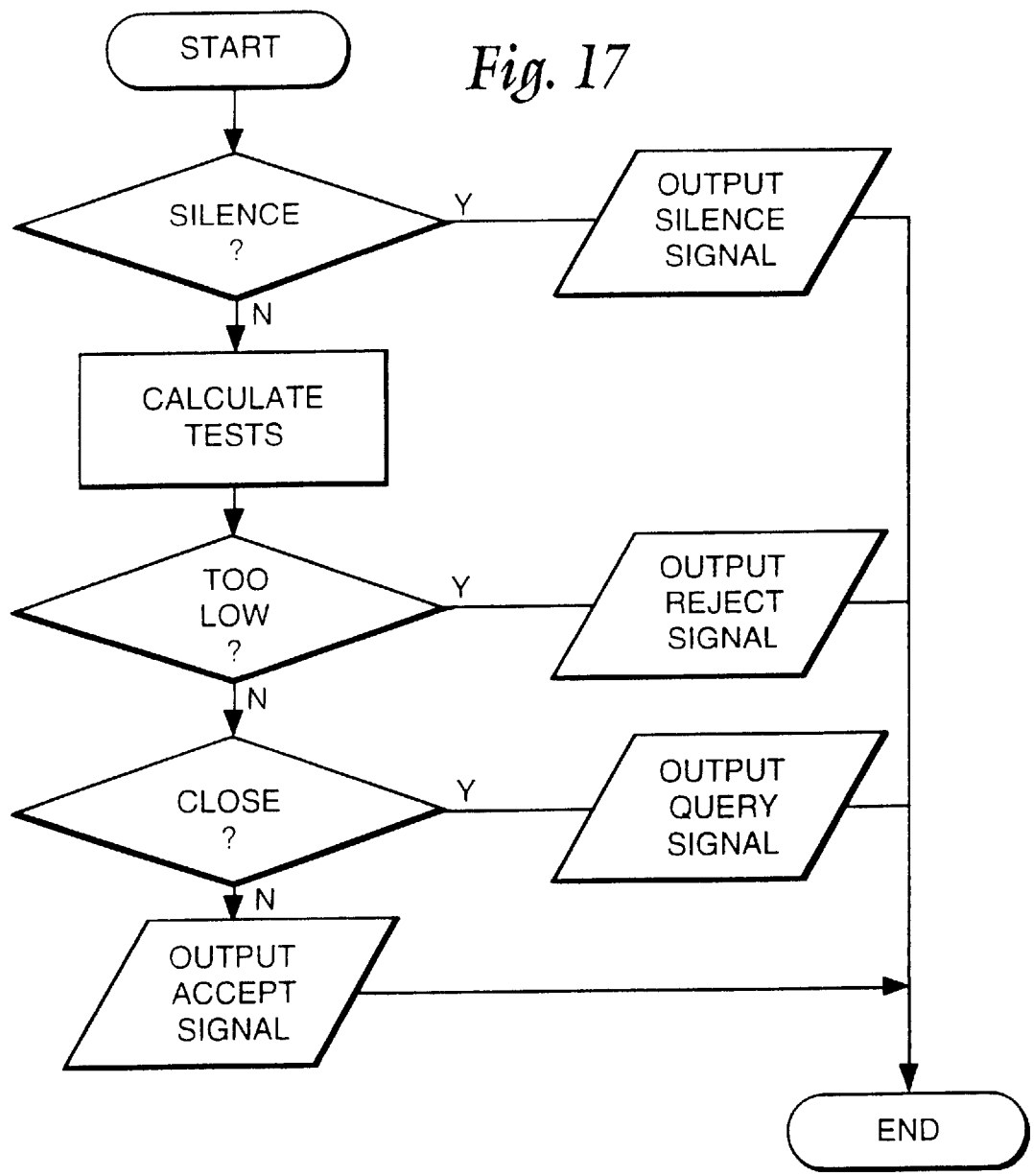
FIG. 17 is a flow diagram illustrating the operation of a rejecter forming part of FIG. 2.

Referring to FIG. 17, the general operation of the rejector 36 is as follows.

Firstly, the rejector tests whether the signal corresponds to the detection of silence or noise alone. This occurs when the most likely sequence detected by the parser 35 corresponds to a sequence containing only noise states. Silence is also detected by testing whether the SNR calculated by the SNR detector 373 lies below a very low threshold. In either case, the rejector indicates that now word (silence) has been detected, provided the test performed by the detector 376a is also met.

Secondly, the rejector performs rejection tests (discussed in greater detail below) and tests the results against relatively loose thresholds. If the relatively loose thresholds are not met, the identification is rejected.

If the relatively loose thresholds are met, the test is repeated against relatively tight thresholds. If the relatively tight thresholds are met, acceptance of the identified word is indicated. If the tight thresholds are not met, a query output is generated, to enable the utilising apparatus to query the user.

The tests performed by the rejector comprise:

1) a test of the probability score S generated for the most likely path by the parser 35 (to reject out-of-vocabulary words;
2) A test using the signal to noise ratio calculated by the SNR detector 372 to reject noisy conditions, and out-of-vocabulary words;
3) A test using the noise variance calculated by the NVR tester 373 (to reject noisy conditions);
4) A test of the ratio between the score generated by the parser for the most likely path and that generated for the second most likely path; and, optionally,
5) A test performed between specific known confusable words (for example, if the most likely word recognised by the parser 35 is "five", and the second most likely is "nine", the difference or the ratio between the two may be tested).

Thus, the rejector 36 can either accept a word, in which case the output of the parser 35 is passed to the output 38; or indicate that silence is present (i.e. no word is present), in which a signal identifying silence is passed the to the output 38; or reject or query the identification of a word by the parser 35, in which case the output of the parser 35 is inhibited and a corresponding "reject" or "query" control signal is passed to the output 38 to enable action by the utilising apparatus 4.

Second Embodiment

In the second embodiment, the feature generator 33 is arranged to compare a newly generated set of feature coefficients with the last—output set of feature coefficients, and only to output a new set of feature coefficients when the overall difference from the earlier set is greater than a predetermined threshold. For example, the distance may be the sum of absolute differences or "city block" distance measure, or any other convenient measure.

It is found that this technique can substantially reduce the amount of calculation required by classifier 34 and parser 35 by, for example, on the order of 60%. Furthermore, since the HMM process makes an assumption that subsequent states are independent of each other, this embodiment may under some circumstances increase the validity of this assumption since it causes each successive set of coefficients to differ substantially from its predecessor.

In this case, it is found that the operation of the classifier 34 and parser 35 are not substantially altered. However, the operation of the signal based pause detector 370, specifically the running averager 371, are altered as the average needs to take account of the duration of the periods between successive frames.

In this embodiment, the feature extractor 33 generates, and supplies to the pause detector 37, a number N(t) associated with each frame, which indicates the number of frames between that frame and the last frame output by the feature generator 33.

The feature extractor 33 also accumulates the energy of each frame, so as to supply a cumulative energy E(t) at each set of feature coefficients which are output, which corresponds to the sum of the energy giving rise to that set of coefficients and the energies of all the other frames between that frame and the previous frame output by the feature extractor 33.

Figure 18:
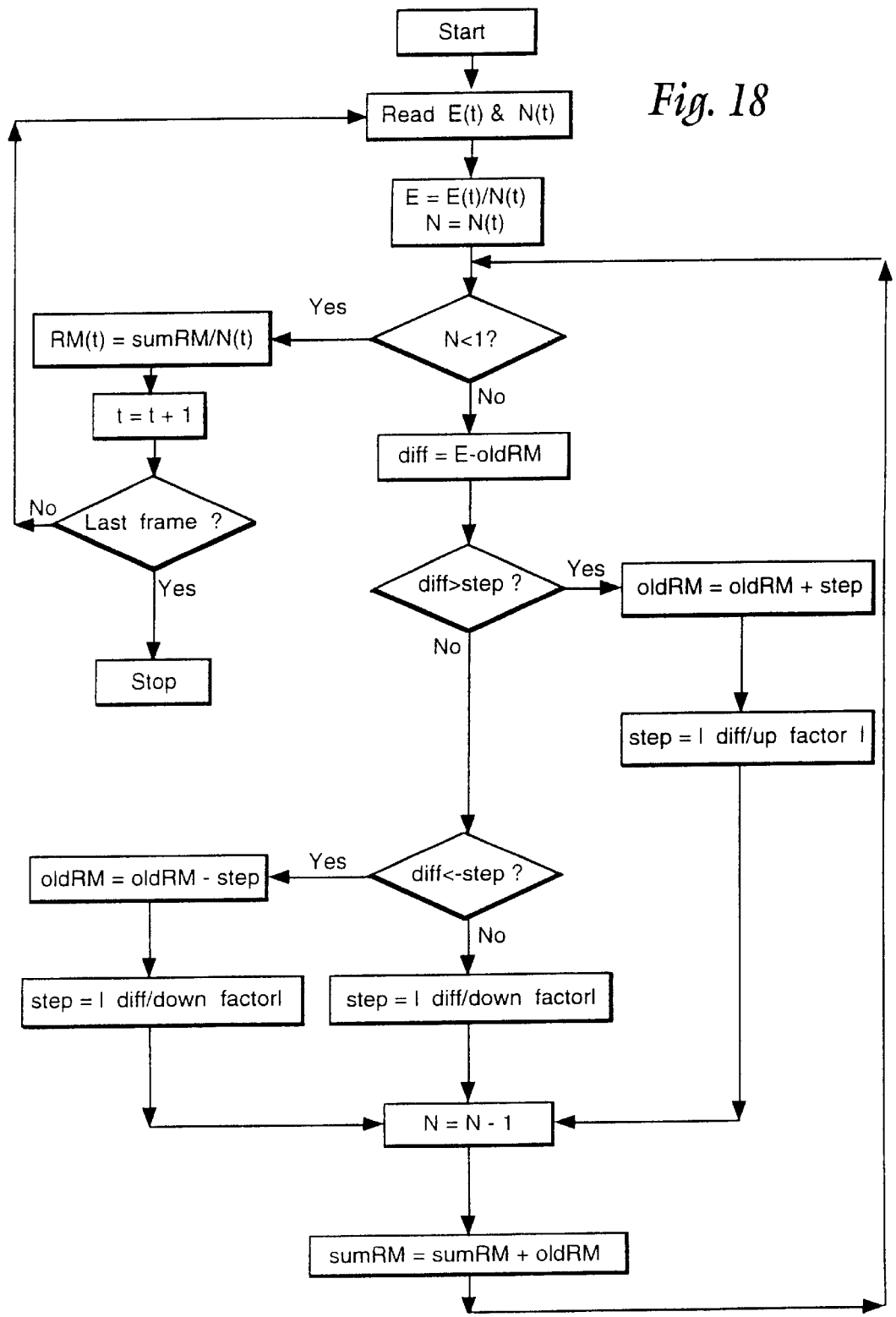
FIG. 18 is a flow diagram corresponding to FIG. 11 illustrating the process of deriving an average in a second embodiment of the invention.

Referring to FIG. 18, in this embodiment the averager 371 reads the cumulative energy E(t) and the number of frames N(t) represented by a VFR frame, and then generates the average energy for each intervening frame by dividing E(t) by N(t). The averager then, essentially, simulates the effect of receiving N(t) successive frames each having average energy, and increments or decrements the running average accordingly.

However, to ensure that the average running energy value used in the signal to noise ratio calculation is correct, the final averaged energy level RM(t) calculated for the VFR frame is found by averaging the N successive running averages by accumulating the running averages and then normalising by N(t) at the end of the calculation.

Thus, in this embodiment, the numbers stored in the output buffer 374 comprise the values RM(t) for each of the frames of the feature coefficients emitted at a variable rate by the coefficient generator 33, which correspond to the average level of the signal frames preceding the current frame.

In fact, in this embodiment, the minimum and maximum energy levels are less clearly defined than the first embodiment because the process of cumulating energy of preceding frames carried out in the feature generator 33 acts to smooth sharp peaks or dips in the energy level of the input speech signal.

In this embodiment, it would of course be possible instead for the averager 371 to receive and process each of the energy levels from each of the signal frames received by the feature generator 33, regardless of whether or not those frames give rise to the outputting of a feature vector for recognition. However, this would require further calculation and buffering.

In this embodiment, the pause tests calculated by the detectors 376a, 376b are calculated so as to take account of the variable rate at which coefficient vectors are generated by maintaining a current frame number calculated by accumulating the numbers of omitted frames N(t) and using this to calculate the time since the end of speech N.

Figure 19:
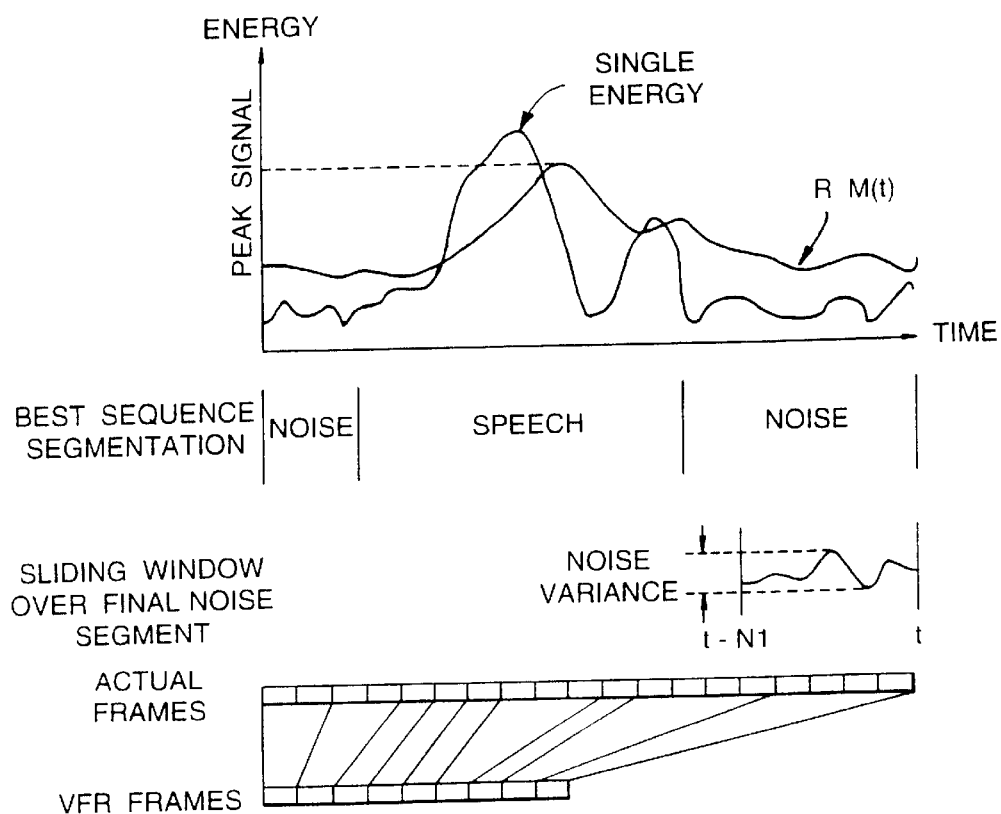
FIG. 19 is a diagram of energy and averaged energy against time in the embodiment of FIG. 18, and corresponds to FIG. 16.

FIG. 19 illustrates the energy, and average energy RM(t), over a word.

Advantages of the Invention

From the foregoing embodiments, ti will be seen that there are a number of advantages to aspects of the invention.

By providing a pause detector in a continuous speech recogniser which actively examines the speech signal, it is possible to provide a rapid recognition of input words, phrases or sentences. By making the pause detector examine parameters which are separate from the speech/noise model, assumed by the speech detector, greater robustness is ensured. It is found that energy based measures can be particularly effective in discriminating between speech and noise, in particular, a test of the difference between the signal level and the noise level (for example, a measure of the signal to noise ratio) generated on the assumption that the noise-speech-noise model used by the recogniser is correct is found to be an effective means of validating the correctness of that assumption. More particularly, a signal to noise ratio calculated between a peak value over a speech period and an average value over a noise period is found to be effective.

As the bases for pause detection, or for other purposes such as rejection of an identified word, it is found advantageous to use an averaged or smoothed measure of the signal energy; in particular, a running average measure and, more particularly, a non-linear average which provides some filtering of noise spikes is preferred. The algorithm may preferably be arranged approximately to track the median rather than the mean of the energy of the signal.

Viewed in another way, the algorithm may be arranged to increment or decrement the running average by a predetermined amount, and the predetermined amount is preferably adapted in dependence upon the difference between the input energy level and the running average.

Further, the use or a measure of the variation of signal energy (an, more specifically, variation of the smooth and averaged signal energy) is found to be a good discriminator allowing the determination of whether only noise is present; in particular, a measure of the ratio between peak energy and minimum energy is generally low if only noise is present. Accordingly, this test can be employed to validate the noise-speech-noise model generated by the recognition process.

The above tests are advantageously, but not necessarily, combined with tests based on the recogniser output itself, such as a test of the score generated by the recognition of noise, and a test of the length of time since the onset of recognised nowise.

The signal based tests described above are found equally to be useful, with different thresholds, to form the basis for subsequent rejection of recognised words under unsafe recognition conditions as described above.

Other Aspects and Embodiments of the Invention

It will be clear from the foregoing that the described embodiments are merely examples of the invention, which is accordingly not limited thereby. In particular, various novel features of the described embodiments each have separate advantages, whether explicitly described above or clear to the skilled person herefrom, and protection is sought for each such advantageous feature in isolation and for any advantageous combination of such features.

The use of a Gaussian, continuous density classifier has been described here, but a classifier using vector quantisation could equally be employed. Similarly, other types of sequence processing (e.g. Dynamic Time Warp) could be employed.

Whilst only a 'repeat' probability and a 'transition' probability have been discussed, probabilities for transitions to next-but-one and next-but-two (etc) states (skipping transitions) are well known and could equally be employed. Likewise, the number of states mentioned above for words and noise are purely exemplary.

Whilst particular embodiments have been described in detail, it will be realised that other embodiments are realisable using digital or analog hardware, suitably constructed or programmed.

Although a recognition syntax has been described in which isolated words (preceded and succeeded by noise) are recognised, the present invention is equally applicable to connected-word recognition. In this case, the state sequence modes would represent sequences of noise-word1-word2- . . . -wordN-noise, and the SNR and noise variance tests would preferably be responsive only to the noise after the end of speech point.

Although speech recognition has been described, use of the same techniques in relation to other types of recognition (for example speaker recognition or verification) is not excluded.

The scope of protection is intended to encompass all constructions within the scope of the claims appended hereto, together with any equivalent constructions achieving substantially the same result or achieving a substantially different result using the same principle or operation.

What is claimed is:

1. A recognition system comprising:
   input means for receiving a speech signal;
   recognition processing means for processing the speech signal to generate a pattern signal identifying a predetermined pattern to which the speech signal is recognized as corresponding;
   output means at which said pattern signal is supplied;
   said recognition processing means being arranged to partition the speech signal into a sequence of successive temporal portions and to compare said sequence of successive temporal portions with a predetermined sequence of pre-speech noise or silence portions; speech pattern portions; and post-speech noise of silence portions, to generate said pattern signal;
   pause detecting means for detecting the arrival of a point in time within said post-speech portion and after the beginning thereof, said pause detection means being responsive to the identification of the onset of the post-speech portions performed by the recognition processing means,
   wherein the pause detection means is arranged, after generation of said pattern signal to receive at least one signal parameter derived from said speech signal which is independent of said onset, to repeatedly perform a detection operation which depends both on said onset and said signal parameter and to route said pattern signal to said output means on detection of said point in time, to enable the immediate operation of utilizing apparatus connected thereto.

2. A system as in claim 1 wherein the said patterns correspond to phonemes, words, phrases or sentences.

3. A system as in claim 2, wherein the said patterns correspond to words.

4. A system as in claim 1 in which the pause detection means is arranged to process said signal parameter in accordance with said partitioning by the recognition processing means, to generate at least one measure which depends upon the accuracy of said partitioning.

5. A system as in claim 4, in which said signal parameter has a different magnitude in the present of noise or silence to that which it has in the presence of a pattern.

6. A system as in claim 5, in which the parameter is related to the energy of said speech signal.

7. A system as in claim 1 in which the pause detection means comprises means for smoothing said parameter over time.

8. A system as in claim 7 in which said smoothing means compromise means for deriving a running average value of said parameter, said running average being employed in generating at least one measure which depends upon the accuracy of said partitioning.

9. A system as in claim 8 in which said running average means is arranged to apply a non-linear smoothing to said parameter, to reduce the effects of abrupt magnitude changes therein.

10. A system as in claim 8 in which said running average is derived to track the median of said parameter.

11. A system as in claim 4 in which the pause detection means comprises variation detecting means for deriving, within said noise or silence portion following said pattern-containing portion, a measure of the level of variation of said parameter or a parameter derived therefrom.

12. A system as in claim 11 in which said variation detecting means is arranged to derive maximum and minimum values of said parameter or derived parameter, and to derive said measure so as to depend upon the ratio between.

13. A system as in claim 12, in which said ratio is derived so as to avoid division by a small number.

14. A system as in claim 11 in which said variation detecting means is arranged to derive said measure in dependence upon values of said parameter over a time window extending over a predetermined past portion of the speech signal lying within said following noise or silence portion.

15. A system as in claim 4 in which the pause detection means comprises means for deriving a measure indicating the relative levels of said parameter, or a parameter derived therefrom, over said pattern-containing portion and over said silence or noise portions.

16. A system as in claim 15 in which said measure is derived so as to depend upon the ratio between a first value derived from said pattern-containing portion and a second value derived from said silence or noise portion.

17. A system as in claim 16 in which the first value comprises a maximum value of said parameter or derived parameter.

18. A system as in claim 16 in which the second value comprises an average value of said parameter or derived parameter.

19. A system as in claim 1 in which the recognition processing means is arranged to recognise noise or silence, and the pause detection means is arranged to respond to the level of confidence of said recognition of noise or silence.

20. A system as in claim 1 in which the pause detection means is arranged to respond to the duration of the silence or noise portion following said pattern-containing portion.

21. A system as in claim 1 in which the recognition processing means comprises means for storing data defining a plurality of state sequence probabilities, and for calculating the likelihood of said speech signal corresponding to each state sequence.

22. A system as in claim 21 in which the recognition processing means comprises:
   means for storing data defining a plurality of continuous probability distributions corresponding to different states, and
   means for applying said distribution data to said speech signal to calculate a measure of the correspondence between the speech signal and each said state.

23. A system claim 1 further comprising:
   means for dividing said speech signal into a successive sequence of portions, and
   means for comparing a said portion with a preceding portion,
   said system being arranged not to operate the recognition processing means when a said portion does not differ substantially from it predecessor.

24. A recognition system according to claim 1, wherein said signal parameter is derived from a plurality of energy levels provided by an energy averager, said energy averager comprising:

means for storing an energy level relating to previous energy levels of the speech signal;

means for comparing the difference between the speech signal energy and said energy level with a threshold;

means for varying the stored energy level in response to the difference exceeding the threshold;

means for varying the threshold depending upon the difference; and output means for providing said energy level.

25. A recognition system comprising:

input means for receiving a speech signal;

recognition processing means for processing the speech signal to indicate its similarity to predetermined patters to be recognised;

output means for supplying a recognition signal indicating recognition of one of said patterns; and rejection means for rejecting the recognition signal under predetermined conditions, the rejection means being arranged to receive at least one signal parameter derived from said speech signal which does not depend upon the output of said recognition means, wherein the recognition means is arranged to partition the speech signal into a pattern-containing portion and, preceding the following said pattern-containing portions, noise or silence portions, and the rejection means is further arranged to be responsive to said partitioning.

26. A system as in claim 22 in which the rejection means is arranged to reject said recognition signal in dependence upon the relative magnitudes of the parameter, or a parameter derived therefrom, during the pattern-containing portion and during the noise or silence portions.

27. A system as in claim 22 in which the rejection means is arranged to reject said recognition signal in dependence upon the degree of variation of the parameter or a parameter derived therefrom over the silence or noise portions.

28. In a speech recognition system, the improvement comprising:

means for operating on a speech signal to repeatedly generate a speech recognition signal, and a pause detector arranged to detect the end of a word to enable an immediate speech recognition output to be supplied at a variable time lapse from a detected end point implicit in the speech recognition signal.

29. In a speech recognition system, the improvement comprising:

a pause detector for detecting the end of a word in dependence upon both an implicit end point of a speech recognition process and a parameter derived from the energy of the speech signal; and means for outputting speech recognition signal in response to said pause detector detecting the end of a word.

30. In a recognition system operating on a speech signal, an energy averager comprising:

means for storing an energy level relating to previous energy levels of the speech signal;

means for comparing the difference between the speech signal energy and said energy level with a threshold;

means for varying the stored average energy level in response to the difference exceeding the threshold; and means for varying the threshold depending upon the difference.

31. A method of operating a speech recognition system which comprises input means for receiving a speech signal, recognition processing means for processing the speech signal and output means for indicating a recognized speech pattern, the method comprising the steps of:

receiving a speech signal;

processing the speech signal to generate a pattern signal identifying a predetermined pattern to which the speech signal is recognized as corresponding to partitioning the speech signal into a sequence of successive temporal portions and comparing said sequence of successive temporal portions with a predetermined sequence of pre-speech noise or silence portions; speech pattern portions; and post-speech noise or silence portions to generate said pattern signal;

detecting the arrival of a point in time within said post-speech portion and after the beginning thereof, said detecting being in response to the identification of the onset of the post-speech portions in the recognition processing step and including repeatedly performing a detection operation which depends both on said onset and a signal parameter derived from said speech signal, which parameter is independent of said onset, and routing said pattern signal to said output means on detection of said point in time, to enable the immediate operation of utilizing apparatus connected thereto.

32. A method of operating a speech recognition system which comprises input means for receiving a speech signal, recognition processing means for processing the speech signal and output means for indicating a recognized speech pattern, the method being to detect the arrival of a point in time after the end of the speech pattern, the method comprising the steps of:

pre-processing a temporal portion of a speech signal received at the input means;

performing a recognition process on that temporal portion and preceding temporal portions to generate a pattern signal identifying a predetermined pattern to which the speech signal is recognized as corresponding; and recognizing whether the point in time has occurred;

wherein the step of recognizing whether the point in time has occurred comprises:

deriving at least one signal parameter from said speech signal which is independent of the partitioning between speech and noise performed by the recognition process;

deriving at least one parameter which depends upon said partitioning; and deciding whether or not said point in time has arrived taking into account both parameters.

\* \* \* \* \*